(12) United States Patent
Tanno et al.

(10) Patent No.: US 11,988,302 B2
(45) Date of Patent: May 21, 2024

(54) FLUID CONTROL DEVICE, ABNORMALITY DETECTION METHOD OF FLUID CONTROL DEVICE, ABNORMALITY DETECTION DEVICE, AND ABNORMALITY DETECTION SYSTEM

(71) Applicant: Fujikin Incorporated, Osaka (JP)

(72) Inventors: Ryutaro Tanno, Osaka (JP); Tsutomu Shinohara, Osaka (JP); Yuya Suzuki, Osaka (JP); Hidenori Kiso, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 363 days.

(21) Appl. No.: 17/264,879

(22) PCT Filed: Jul. 16, 2019

(86) PCT No.: PCT/JP2019/027962
§ 371 (c)(1),
(2) Date: Feb. 1, 2021

(87) PCT Pub. No.: WO2020/031628
PCT Pub. Date: Feb. 13, 2020

(65) Prior Publication Data
US 2021/0302264 A1 Sep. 30, 2021

(30) Foreign Application Priority Data

Aug. 10, 2018 (JP) .................. 2018-151587

(51) Int. Cl.
*F16K 37/00* (2006.01)
*F16K 7/14* (2006.01)
(Continued)

(52) U.S. Cl.
CPC .............. *F16K 37/005* (2013.01); *F16K 7/14* (2013.01); *F16K 31/1262* (2013.01);
(Continued)

(58) Field of Classification Search
CPC ............. F16K 31/1266; F16K 31/1262; F16K 37/005; F16K 37/0025; F16K 37/0033;
(Continued)

(56) References Cited

U.S. PATENT DOCUMENTS 6,050,296 A * 4/2000 Hoffmann ............... F16K 41/10
137/557
2005/0092079 A1 5/2005 Ales
(Continued)

FOREIGN PATENT DOCUMENTS

CN 101191482 A 6/2008
CN 102292625 A 12/2011
(Continued)

*Primary Examiner* — Atif H Chaudry
(74) *Attorney, Agent, or Firm* — WCF IP

(57) ABSTRACT

A fluid control device, capable of detecting leaks even if the leaks is slight, is provided. Further, a fluid leak abnormality is identified as a change accompanying an operation of the fluid control device and the fluid leaks is detected with high accuracy. A fluid control device, having a flow path and a closed space isolated from the flow path by a diaphragm and capable of detecting an abnormality, includes a pressure sensor detecting a pressure inside of the closed space, a processing module executing a predetermined information process, and an operation detecting mechanism detecting an operation of the fluid control device. The processing module executes a discriminating process discriminating abnormality of the fluid control device by comparing a detected value detected by the pressure sensor with a predetermined threshold value, and a correcting process correcting the predetermined threshold value in accordance with the operation of the fluid control device.

8 Claims, 11 Drawing Sheets

(51) Int. Cl.
*F16K 31/126* (2006.01)
*G01M 3/28* (2006.01)

(52) U.S. Cl.
CPC ....... *F16K 31/1266* (2013.01); *G01M 3/2876* (2013.01); *G01M 3/2815* (2013.01)

(58) Field of Classification Search
CPC ............ F16K 37/0041; G01M 3/2876; G01M 3/2815
See application file for complete search history.

(56) References Cited

U.S. PATENT DOCUMENTS

| | | |
|---|---|---|
| 2008/0138214 A1 | 6/2008 | Yajima |
| 2010/0288019 A1 | 11/2010 | Simmons |
| 2014/0076033 A1 | 3/2014 | Simmons |
| 2015/0143876 A1 | 5/2015 | Dohi et al. |
| 2016/0208676 A1* | 7/2016 | de Andrade Filho ........................ F16K 31/402 |
| 2018/0231144 A1* | 8/2018 | Anderson .......... G05B 23/0235 |

FOREIGN PATENT DOCUMENTS

| | | |
|---|---|---|
| JP | S63-169754 | 7/1988 |
| JP | 02091932 U1 | 7/1990 |
| JP | H04-093736 A | 3/1992 |
| JP | H05-126669 A | 5/1993 |
| JP | 2002-168400 A | 6/2002 |
| JP | 2007-162873 A | 6/2007 |
| JP | 2008-133800 A | 6/2008 |
| JP | 2014-21029 A | 2/2014 |
| WO | WO/2010/135224 | 11/2010 |

* cited by examiner (a)

(b)

FLUID CONTROL DEVICE, ABNORMALITY DETECTION METHOD OF FLUID CONTROL DEVICE, ABNORMALITY DETECTION DEVICE, AND ABNORMALITY DETECTION SYSTEM

CROSS-REFERENCE

This application is a national phase of an international application, PCT/JP2019/027962 filed on Jul. 16, 2019, which claims the benefit of Japanese Application No. 2018-151587, filed on Oct. 10, 2018.

TECHNICAL FIELD

The present invention relates to a technique for detecting fluid leakage in a fluid control device.

BACKGROUND ART

Conventionally, a film forming process to form thin films on surfaces of semiconductor wafers required a precise control of a film thickness, and in recent years, a film forming method called ALD (Atomic Layer Deposition) has been used for forming a thin film with an atomic or molecular level thickness.

However, such a film forming process requires a fluid control device, which supplies fluid to a film forming apparatus, to perform switching operations at a very high frequency, and such load can cause fluid to leak or the like more easily. Therefore, there is a high demand for technology that can easily detect fluid leakage in a fluid control device.

Further, because highly reactive and extremely toxic gas is used in semiconductor manufacturing processes, it is important to be able to remotely detect leaks while the leaks are small.

On this point, Patent Document 1 discloses a seal portion damage detection mechanism including a hole formed on the outer surface of a controller for controlling the flow rate of a fluid and a leak detection member attached to the hole, where the hole communicates with a gap in the controller. The leak detection member includes a cylindrical body attached to the hole and a movable member provided in the cylindrical body, and the movable member is proposed to be movable outward of the cylindrical body by the pressure of the leaked fluid filled in the gap in the controller.

Further, Patent Document 2 discloses a controller with a seal portion damage detection mechanism including a hole formed on the outer surface of the controller for controlling the flow rate of a fluid and a leak detection member attached to the hole, where the hole communicates with the space in the controller, and the leak detection member is sensitive to the presence of a specific fluid.

Furthermore, Patent Document 3 discloses a leak detection device for detecting a fluid leak. It proposed a device including a sensor holding body, an ultrasonic sensor held by the sensor holding body to face a leak port that communicates with the outside, a sealed portion provided in the leak detection target member, an ultrasonic wave path provided between the sensor surface of the ultrasonic sensor and the leak port, and a circuit for processing ultrasonic waves obtained by the ultrasonic sensor.

CITATION LIST

Patent Documents

Patent Document 1: JP 04-093736 A
Patent Document 2: JP 05-126669 A
Patent Document 3: JP 2014-21029 A

SUMMARY OF INVENTION

Technical Problem

However, in the seal portion damage detection mechanism described in Patent Document 1, although the pressure of the gap in the controller can be determined but not the negative pressure, and when the leakage of the fluid is slight, there is a possibility that the movable member does not move sufficiently and the leak cannot be detected.

Further, in the controller with a seal portion damage detection mechanism described in Patent Document 2, when fluid leakage is slight, there is a possibility that the leak detection member may not be responsive because of dilution with purge gas, and there is also a possibility that the leakage detection member does not respond to a predetermined fluid.

Furthermore, in the leak detection device described in Patent Document 3, when the leakage of a fluid is slight, the ultrasonic wave can be weak and the leakage may not be detected.

Similarly in the techniques described in other patent documents, there is room for improvement in the ability to detect minute leaks of the fluid. In addition, it is difficult to detect leaks of the fluid with high accuracy unless abnormality in leaks of the fluid can be distinguished from a change accompanying an operation of the fluid control device.

Thus, an object of the present invention is to provide a fluid control device capable of detecting a leak even when the leak of the fluid is slight. Another object of the present invention is to distinguish abnormality in leaks of the fluid as a change accompanying an operation of the fluid control device and detect leaks of the fluid with high accuracy.

Solution to Problem

In order to achieve the above objects, a fluid control device according to one aspect of the present invention is the fluid control device, having a flow path and a closed space isolated from the flow path by an isolation member and capable of detecting an abnormality of the fluid control device, having a pressure sensor detecting a pressure inside of the closed space, a processing module executing a predetermined information process, and an operation detecting mechanism detecting an operation of the fluid control device. The processing module executes a discriminating process discriminating abnormality of the fluid control device by comparing a detected value detected by the pressure sensor with a predetermined threshold value, and a correcting process correcting the predetermined threshold value in accordance with the operation detected by the operation detecting mechanism.

Further, the operation detecting mechanism may be a driving pressure sensor detecting a driving pressure of the fluid control device, and the correcting process may correct the predetermined threshold value in accordance with a detected driving pressure of the fluid control device.

Further, the operation detecting mechanism may be an opening/closing detecting mechanism detecting an opening/closing operation of the fluid control device, and the correcting process may correct the predetermined threshold value in accordance with a detected opening/closing operation of the fluid control device.

Further, the operation detecting mechanism may include an automatic learning means identifying an opening/closing operation by a pattern analysis based on a correlation between a fluctuation pattern of the detected value and the opening/closing operation.

Further, a temperature sensor measuring an external temperature may be further included, and the correcting process may correct the predetermined threshold value in accordance with the operation of the fluid control device and the external temperature.

Further, the isolation member may be a diaphragm, and the fluid control device may have a valve mechanism opening and closing the flow path when the diaphragm is brought into contact with and detached from a seat provided to the flow path.

Further, an abnormality detection method for a fluid control device according to another aspect of the present invention is a method capable of detecting an abnormality of the fluid control device, having a flow path and a closed space isolated from the flow path by an isolation member, and the method includes a step detecting a pressure inside of the closed space by a pressure sensor, a step detecting an operation of the fluid control device, a step discriminating an abnormality of the fluid control device by comparing a detected value detected by the pressure sensor with a predetermined threshold value, and a step correcting the predetermined threshold value in accordance with the operation of the fluid control device.

Further, an abnormality detection device for a fluid control device according to another aspect of the present invention is a device for detecting an abnormality of the fluid control device, having a flow path and a closed space isolated from the flow path by an isolation member, and the abnormality detection device includes a discrimination processing unit discriminating the abnormality of the fluid control device by comparing a detected value of a pressure of the closed space with a predetermined threshold value, and a correction processing unit correcting the predetermined threshold value in accordance with an information related to an operation of the fluid control device.

Further, an abnormality detection system for a fluid control device according to another aspect of the present invention is a system for detecting an abnormality of the fluid control device having a flow path and a closed space isolated from the flow path by an isolation member. The system includes a communication module in the fluid control device and an external terminal provided to be able to communicate. The fluid control device includes a pressure sensor detecting a pressure inside of the closed space, an operation detecting mechanism detecting an operation of the fluid control device, a communication module transmitting a detected value detected by the pressure sensor and an information related to a detected operation of the fluid control device detected by the operation detecting mechanism to the external terminal. The external terminal executes a process discriminating the abnormality of the fluid control device by comparing a detected value of a pressure inside of the closed space received from the fluid control device with a predetermined threshold value, and a process correcting the predetermined threshold value in accordance with an information received from the fluid control device and related to the operation of the fluid control device.

Effect of the Invention

According to the present invention, the fluid control device can detect a leakage even when the leaks of the fluid is slight. In addition, it is possible to distinguish abnormality in leaks of the fluid as a change accompanying an operation of the fluid control device and detect leaks of the fluid with high accuracy.

PREFERRED EMBODIMENT

Example 1

Figure 1:
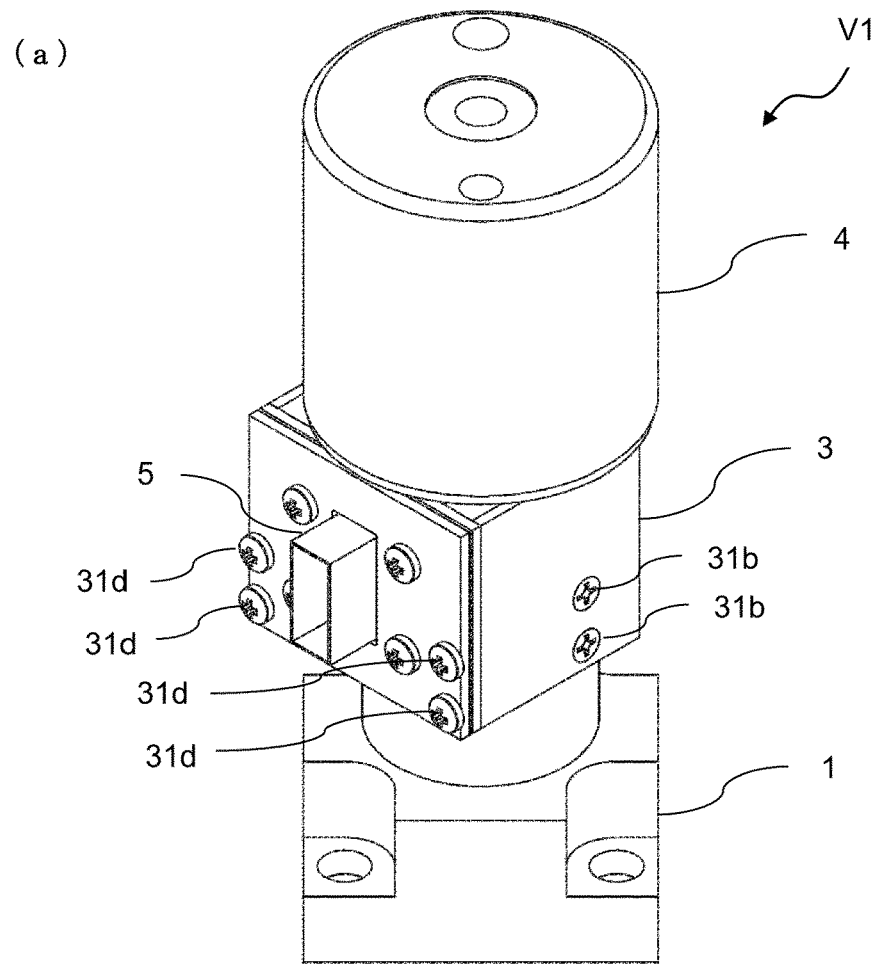
FIG. 1 is a diagram illustrating (a) an external perspective view and (b) a plan view of the fluid control device according to the present embodiment.
Figure 1:
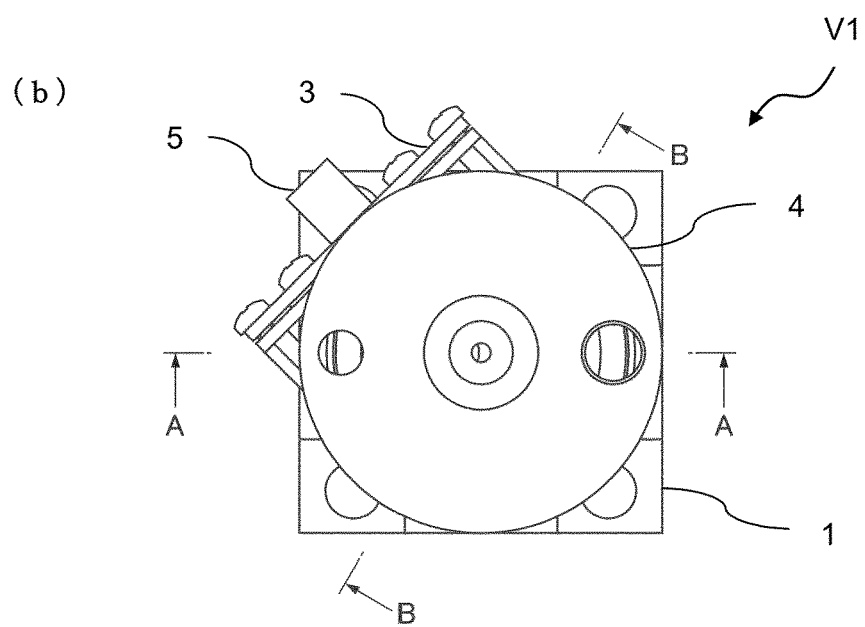

A fluid control device according to an embodiment of the present invention will be described below with reference to the drawings.

In the following description, the directions of members and the like may be referred to as upper, lower, left, and right depending on the directions in the drawings for the sake of convenience, but these do not limit the directions of members or the like in the actual situation or an embodiment of the present invention.

As illustrated in FIG. 1, a fluid control device V1 according to the present embodiment is a device capable of detecting an internal operation by an internal sensor and can detect abnormality of the fluid control device V1 based on a detected information, particularly a leaks of the fluid within the fluid control device V1.

Figure 7:
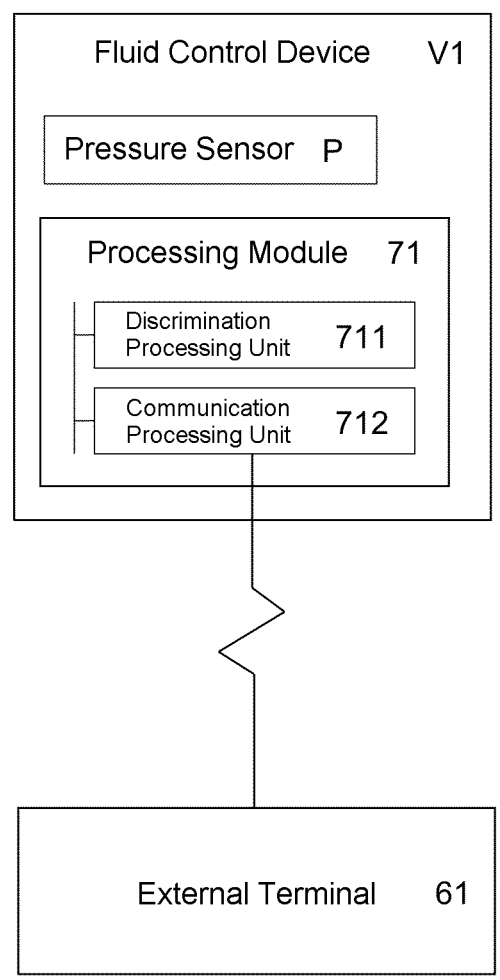
FIG. 7 is a functional block diagram showing functions of the fluid control device according to the present embodiment.

Further, as illustrated in FIG. 7, this fluid control device V1 is connected to an external terminal 61 and provides information related to the abnormality of the fluid control device V1 and detected by the sensor to the external terminal 61.

In a practical use of the fluid control device V1, a plurality of the fluid control devices V1 are integrated with other flow rate control devices to form a fluid control apparatus (gas box).

First, a hard ware configuration of the fluid control device V1 according to the present embodiment will be described.

Figure 2:
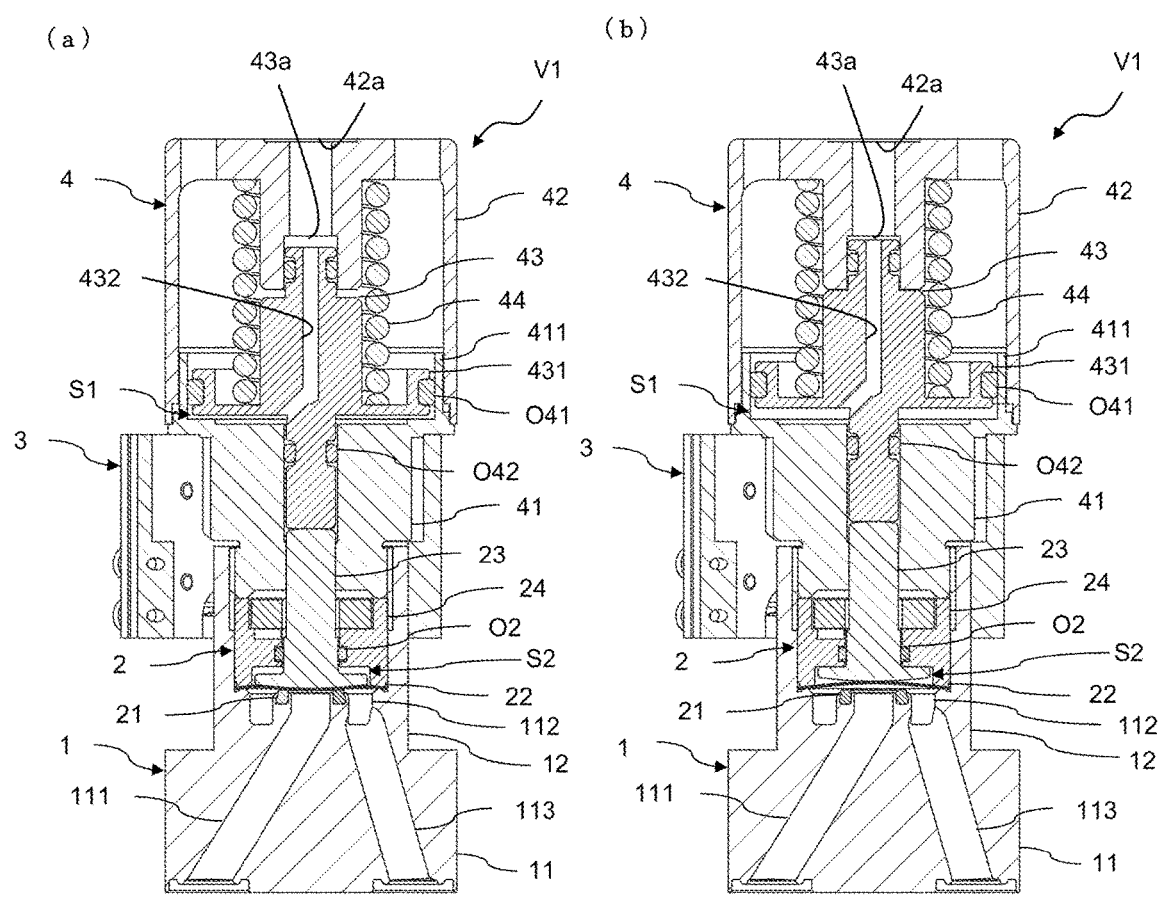
FIG. 2 is a diagram illustrating a cross-sectional view taken along line A-A of an internal structure of the fluid control device according to the present embodiment, and (a) is illustrating a closing valve state and (b) is illustrating an opening valve state.
Figure 3:
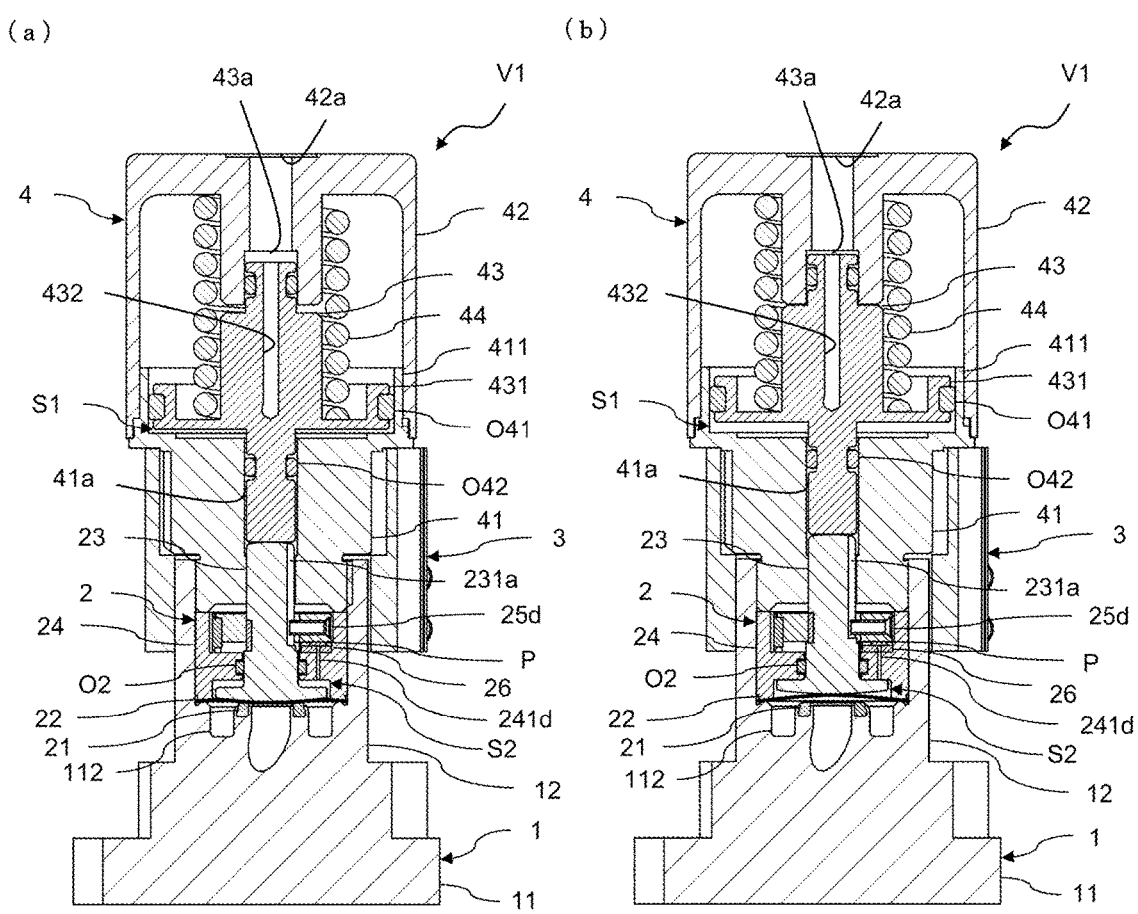
FIG. 3 is a diagram illustrating a cross-sectional view taken along line B-B of an internal structure of the fluid control device according to the present embodiment, and (a) is illustrating a closing valve state and (b) is illustrating an opening valve state.

The fluid control device V1 according to the present embodiment is an air-operated direct diaphragm valve, as illustrated in FIG. 1 to FIG. 3, and includes a valve body 1, a bonnet part 2, a cover part 3, and an actuator part 4.

Valve Body 1

Figure 4:
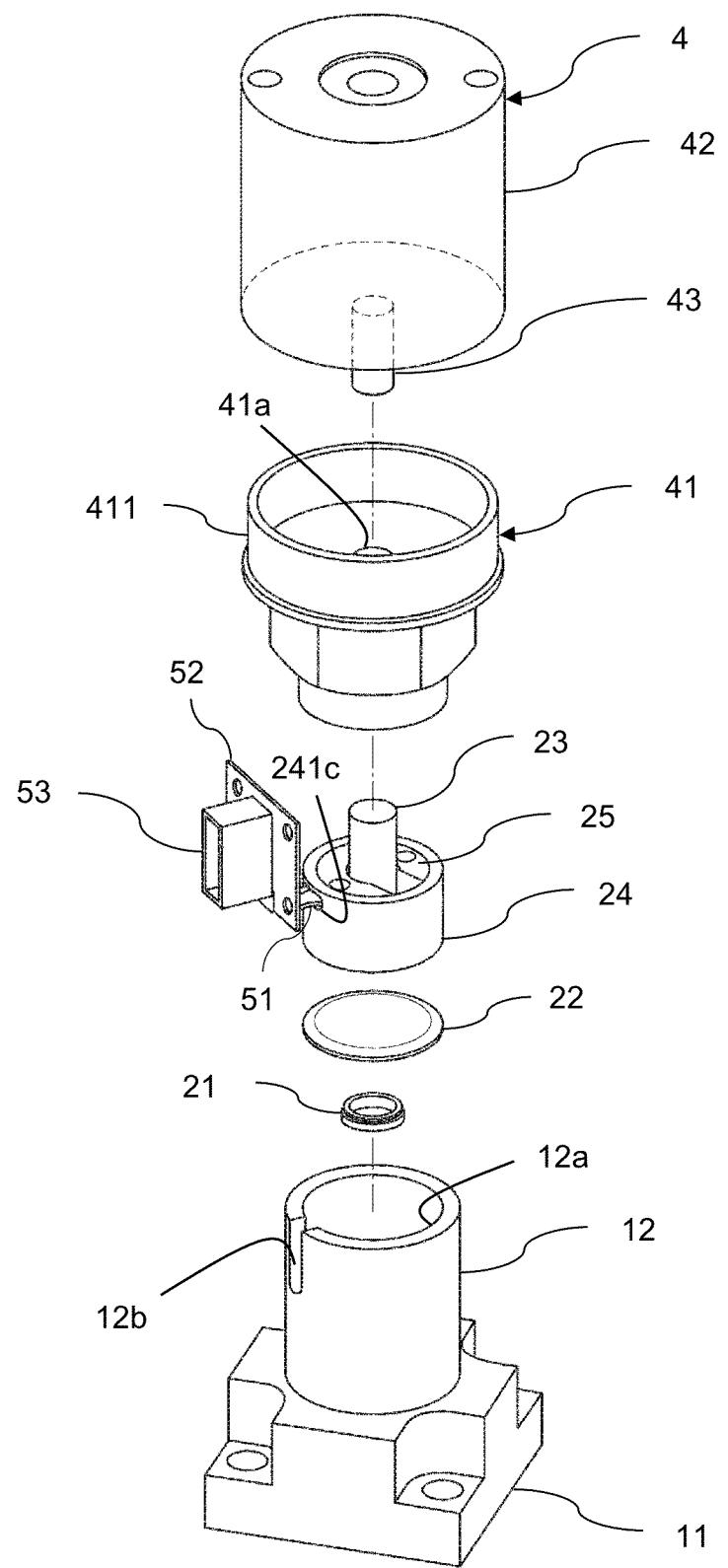
FIG. 4 is a diagram illustrating an exploded perspective view of the fluid control device according to the present embodiment.
Figure 5:
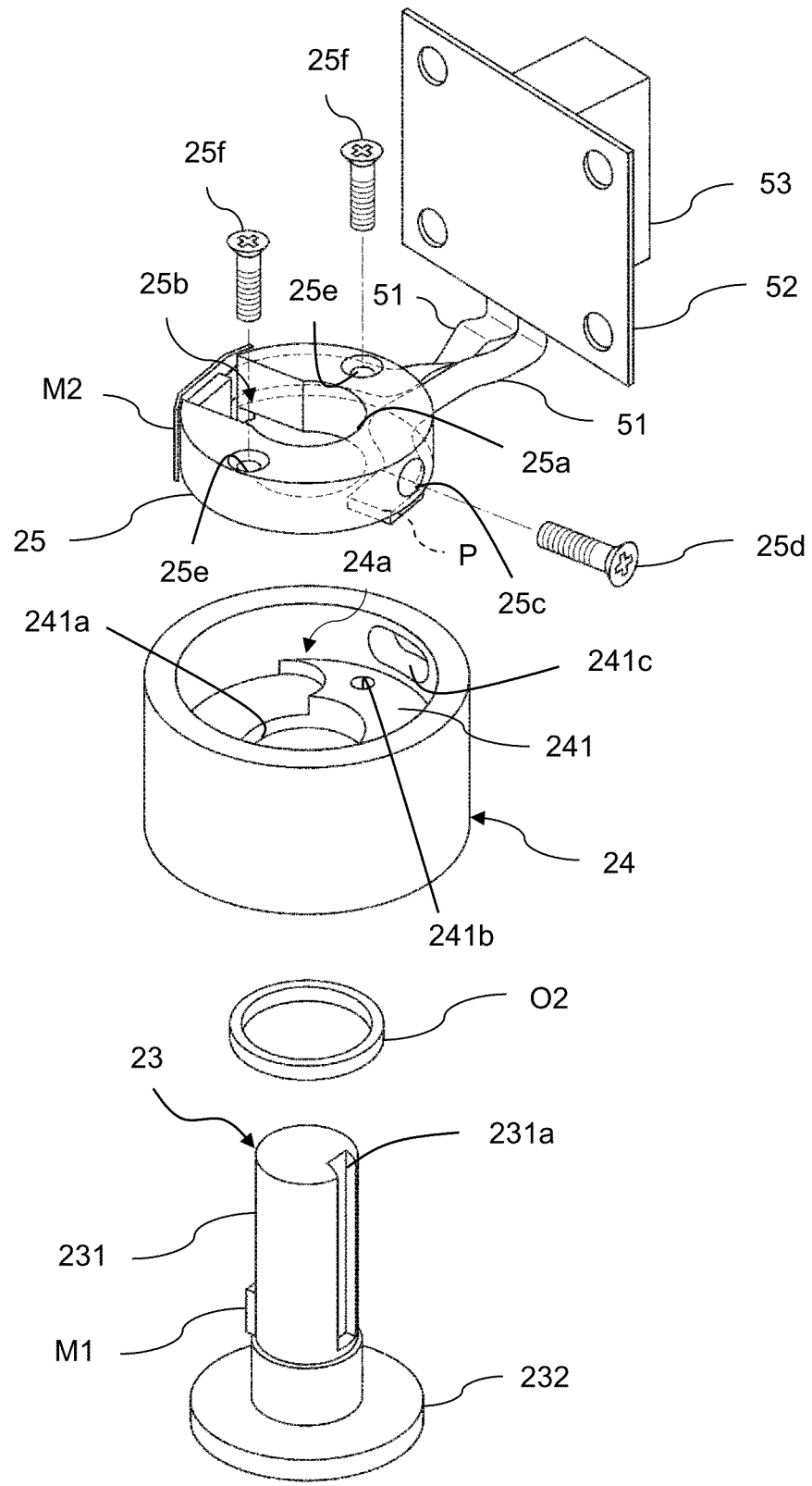
FIG. 5 is a diagram illustrating an exploded perspective view of the fluid control device according to the present embodiment.

The valve body 1, as illustrated in FIG. 2 to FIG. 4, includes a base 11 where a flow path is formed and a cylindrical part 12 of substantially cylindrical shape provided on the base 11.

The base 11 is a rectangular shape in a plan view and becomes a part located on a substrate or a manifold block when it configures a fluid control apparatus unitized by a plurality of the fluid control devices V1.

The cylindrical part 12 is a hollow shape with an open end face on a side where the bonnet part 2 is arranged, and inside of the hollow constitutes a recess 12a storing the bonnet part 2.

This cylindrical part 12 has a slit 12b, which has a length in an axial direction, which opens on one side opposite to the base 11 and at a side where the bonnet part 2 is placed, and which is penetrated to a side of the recess 12a from the outside. A flexible cable 51 extending from a bonnet wall 25 through this slit 12b is led out from the inside to the outside.

Below the recess 12a and the inside of the base 11, an inflow path 111 where a fluid flows in, an outflow path 113 where the fluid flows out, and a valve chamber 112 connecting with the inflow path 111 and the outflow path 113, are formed. The inflow path 111, the outflow path 113, and the valve chamber 112 integrally constitute a flow path where the fluid flows.

Bonnet Part 2

The bonnet part 2, as illustrated in FIGS. 2 to 5, is placed in a state of being stored in the inside of the recess 12a of the valve body 1.

This bonnet part 2 includes a seat 21, a diaphragm 22, a diaphragm retainer 23, a bonnet 24, and the bonnet wall 25.

The annular seat 21 is provided on an open periphery of an inflow path 111 in a valve chamber 112. By making the seat 21 brought into contact with and detached from the diaphragm 22, the fluid can flow from the inflow path 111 to the outflow path 113, or the flow can be blocked.

The diaphragm 22 is made of metal such as stainless steel or a NiCo-based alloy, is a spherical shell-shaped member with a convex central part, and separates the flow path from a space where the actuator part 4 operates. When the diaphragm 22 is not pressed by the diaphragm retainer 23, the diaphragm 22 is detached from the seat 21 as illustrated in FIG. 2 (b) and FIG. 3 (b), and the inflow path 111 and the outflow path 113 are in a connected state. On the other hand, in a state of being pressed by the diaphragm retainer 23, as illustrated in FIG. 2(a) and FIG. 3(a), a central part of the diaphragm 23 is deformed and brought into contact with the seat 21, and the inflow path 111 and the outflow path 113 are blocked.

The diaphragm retainer 23 is provided on an upper side of the diaphragm 22 and presses the central part of the diaphragm 22 in conjunction with a vertical move of a piston 43.

This diaphragm retainer 23 includes a substantially cylindrical base body 231 and an increased diameter portion 232, where a diameter is increased at one end side that is brought into contact with the diaphragm 22.

A groove 231a, having a length in an axial direction and one end open on a side opposite to the increased diameter portion 232, with a bottom is formed on the base body 231. A shank part of a screw 25d, screwed into a screw hole 25c of the bonnet wall 25, fits slidably within this groove 231a. The groove 231a and the screw 25d constitute a rotation regulator limiting circumferential rotation of the diaphragm retainer 23. As a result, the diaphragm retainer 23 is limited from circumferential rotation while vertically moving in conjunction with the piston 43.

A magnet M1 constituting a magnetic sensor is installed in the base body 231. This magnet M1 constitutes the magnetic sensor, described later, with a magnetic body M2, installed on the bonnet wall 25. In this embodiment, the magnet M1 is installed on an opposite side of the groove 231a of the base body 231, but it is also possible to install on other positions of the base body 231 as long as there is no problem in constituting the magnetic body M2 and the magnetic sensor.

The bonnet 24 is substantially cylindrical, and is stored in the recess 12a of the valve body 1.

The diaphragm 22 is supported between a lower end of the bonnet 24 and the valve body 1, and this part forms a seal between the diaphragm 22 and the valve body 1.

A substantially disk-shaped partition 241, where a penetration hole 241a is formed in a center and the diaphragm retainer 23 is penetrated to the penetration hole 241a, is provided inside of the bonnet 24.

The bonnet wall 25 is stored in the recess 24a, formed above the partition 241 or on a side where the actuator part 4 is arranged. Screw holes 241b and through holes 25e are provided in each of the partition 241 and the bonnet wall 25 at positions corresponding to each other, and the bonnet wall 25 is screwed to the bonnet 24 by a bolt 25f.

The partition 241 of the bonnet 24 has a certain thickness, and O-ring O2 is interposed between an inner peripheral surface of the penetration hole 241a formed in the partition 241 and the diaphragm retainer 23. As a result, an airtightness of a space defined by the partition 241 and the diaphragm 22 is ensured.

Further, a connection hole 241d, connected to a pressure sensor P installed in the bonnet wall 25, is provided in the partition 241 of the bonnet 24. Since the pressure sensor P is provided through the connection hole 241d, a pressure inside of a closed space S2 defined by the partition 241, the diaphragm 22, and the diaphragm retainer 23, is possible to be measured.

Furthermore, on a side of the bonnet 24, a through hole 241c is provided for leading the flexible cable 51, leading from the bonnet wall 25 stored inside, to the outside.

The bonnet wall 25 is a member arranged in the bonnet 24. This bonnet wall 25 has a shape that is a thick substantially disk-shaped member hollowed out in a C-shape in a plan view. In a center of the bonnet wall 25, a penetration hole 25a is provided to penetrate the base body 231 of the diaphragm retainer 23. In addition, an opening 25b is provided to open the penetration hole 25a to an outward in a radial direction of the bonnet wall 25.

The screw hole 25c, threaded outward in a radial direction from the penetration hole 25a, is formed at a predetermined location of a thick part of the bonnet wall 25. The screw 25d is screwed into this screw hole 25c from the outside, and an axial part of the screwed screw 25d comes out to the penetration hole 25a and slidably fits to the groove 231a of the diaphragm retainer 23 penetrated to the penetration hole 25a.

The through hole 25e is provided in the bonnet wall 25 at a position corresponding to the screw hole 241b of the bonnet 24. The bolt 25f is screwed into the screw hole 241b and the through hole 25e with the bonnet wall 25 arranged on the partition 241 of the bonnet 24, whereby the bonnet wall 25 is fixed to the bonnet 24.

The flat plate-shaped magnetic body M2, fixed to lay and close the opening 25b, is installed close to the opening 25b of an outer peripheral surface of the bonnet wall 25. This magnetic body M2 constitutes the magnetic sensor described later with the magnet M1 installed in the diaphragm retainer 23.

Cover Part 3

Figure 6:
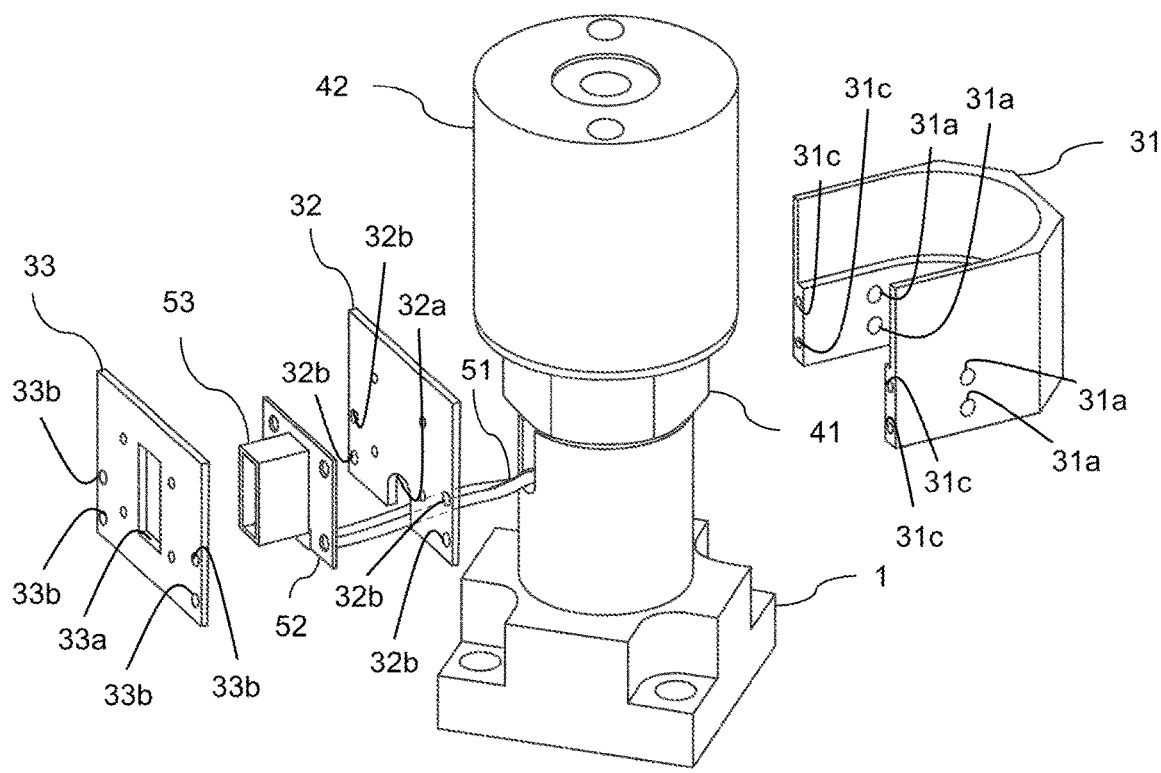
FIG. 6 is a diagram illustrating an exploded perspective view of the fluid control device according to the present embodiment.

The cover part 3, as illustrated in FIG. 1 and FIG. 6, compresses and integrally holds an actuator body 41 and the valve body 1, and constitutes a fastener fastening a circuit board 52 and a connector 53, provided in the circuit board 52, to the fluid control device V1.

This cover part 3 includes a cover 31 and flat plates 32 and 33.

The cover 31 is a substantially U-shaped, and the actuator body 41 and an end part of the valve body 1 is fitted inside of the cover 31.

Screw holes 31a are provided on both sides of the cover 31 corresponding to positions where the actuator body 41 is fitted. As a result, when the screw 31b is screwed into the screw hole 31a with the valve body 1 fitted inside and a tip of the screw 31b is pressed against the valve body 1, the inside of the cover 31 is able to support the valve body 1 from both sides thereof.

Furthermore, the screw holes 31c are provided in a thick part of the cover 31. The plates 32 and 33 are installed to the cover 31 by screwing the screws 31d into the screw holes 31c via the through holes 32b and 33b of the plates 32 and 33.

The plates 32 and 33 are screwed and fixed to the cover 31 while the actuator body 41 and the end part of the valve body 1 are fitted inside of the cover 31, and compresses and holds the actuator body 41 and the valve body 1 between the cover 31 in the fixed state.

A notch 32a cut out a tongue-shape is formed below the plate 32, and the flexible cable 51 is lead via this notch 32a to the circuit board 52, where the connector 53 is provided.

The plate 33 is screwed and fixed to the plate 32 and the cover 31 while the circuit board 52 is interposed between the plates 32 and 33, and compresses and holds the circuit board 52 between the plates 32 and 33.

The plate 33 is provided with a substantially rectangular shaped through hole 33a in a central part, and the connector 53 provided in the circuit board 52 is lead to the outside from this through hole 33a.

The base 11 is in a rectangular shape in a plan view, and the cover part 3, as illustrated in FIG. 1(b), fixes the connector 53 to the fluid control device V1 in a diagonal direction of the rectangular base 11. The reason for fixing the connector 53 in this direction is as follows. When constituting the fluid control apparatus (a gas box) unitized by a plurality of the fluid control devices V1, it is preferable to align a direction of adjacent rectangular base 11 to eliminate intervals as much as possible, and it is preferable to arrange the fluid control device V1 on the substrate or the manifold block due to a demand for integration. On the other hand, when they are arranged and integrated in this way, it becomes difficult to connect terminals or the like to the connector 53. Thus, by turning the connector 53 in the diagonal direction of the base 11, it is possible to take a wider space for connection compared to turning to a direction of the fluid control device V1, located right next to it. As a result, it is easy to connect terminals and the like to the connector 53, it is possible to prevent problems such as disconnection due to broken or twisted terminals and the like, and it is possible to prevent problems that terminals come into contact with the fluid control device V1 to cause an abnormality in an operation of the fluid control device V1.

Actuator Part 4

The actuator part 4 is arranged above the bonnet part 2. This actuator part 4, as illustrated in FIG. 2 and FIG. 3, includes the actuator body 41, an actuator cap 42, a piston 43, and a spring 44. Although the internal structure of the actuator part 4 is omitted in FIG. 4, the internal structure is illustrated in FIG. 2 and FIG. 3.

The actuator body 41 is interposed between the piston 43 and the bonnet 24.

As illustrated in FIG. 4, the actuator body 41 has a substantially cylindrical shape, and a penetration hole 41a where the piston 43 and the diaphragm retainer 23 is penetrated is provided along a length direction at a center. As illustrated in FIG. 2 and FIG. 3, the piston 43 is brought into contact with the diaphragm retainer 23 in the penetration hole 41a, and the diaphragm retainer 23 vertically moves in conjunction with a vertical move of the piston 43.

A peripheral wall 411 having an annular projection is formed on an upper end surface on a side where the piston 43 of the actuator body 41 is arranged, and a driving pressure introduction chamber S1, where a driving pressure is introduced, is formed between a flat horizontal surface inside of the peripheral wall 411 and a lower end surface of the increased diameter portion 431 of the piston 43.

Further, an external thread is threaded on an outer peripheral surface of a side where the piston 43 of the actuator body 41 is arranged, and the actuator body 41 is installed to one end of the actuator cap 42 by screwing the external thread to an internal thread threaded on an inner peripheral surface of the actuator cap 42.

A center of a length direction of the actuator body 41 is formed a substantially hexagonal shape in a cross sectional view, an upper end part of the substantially hexagonal shape in a cross sectional view and the valve body 1 are integrally compressed by the cover 31.

The actuator cap 42 is a cap-shaped member, having an open lower end, and stores the piston 43 and the spring 44 inside.

An opening 42a, connecting to a driving pressure introduction path 432 of the piston 43, is provided in an upper end surface of the actuator cap 42.

A lower end of the actuator cap 42 is closed by screwing an upper part of the actuator body 41.

The piston 43 vertically moves in conjunction with supplying and stopping of the driving pressure, and the diaphragm 22 is brought into contact with and detached from the seat 21 through the diaphragm retainer 23.

A substantially center in an axial direction of the piston 43 is expanded in a disk-shape and constitutes the increased diameter portion 431. The piston 43 receives a bias of the spring 44 on an upper surface of the increased diameter portion 431. Further, the driving pressure introduction chamber S1 where the driving pressure is supplied is formed on a lower end of the increased diameter portion 431.

Furthermore, the driving pressure introduction path 432 is provided inside of the piston 43 to connect the opening 43a, formed on an upper end surface, to the driving pressure introduction chamber S1, formed on a lower end. The opening 43a of the piston 43 is connected to the opening 42a of the actuator cap 42, an introduction pipe introducing the driving pressure from the outside is connected to the opening 42a, and the driving pressure is supplied to the driving pressure introduction chamber S1 as a result.

An O-ring O41 is installed on an outer peripheral surface of the increased diameter portion 431 of the piston 43, and the O-ring O41 seals an outer peripheral surface of the increased diameter portion 431 and the peripheral wall 411 of the actuator body 41. Further, an O-ring O42 is installed on a lower end of the piston 43, and the O-ring O42 seals an outer peripheral surface of the piston 43 and an inner peripheral surface of the penetration hole 41a of the actuator body 41. The driving pressure introduction chamber S, connected to the driving pressure introduction path 432 in the piston 43 is formed by these O-rings O41 and O42, and an airtightness of this driving pressure introduction chamber S1 is ensured.

The spring 44 is wound around an outer peripheral surface of the piston 43, is brought into contact with an upper surface of the increased diameter portion 431 of the piston 43, and biases the piston 43 in a downward direction, such as a direction pushing down the diaphragm 22.

An opening/closing operation of the valve accompanying a supply and a stop of the driving pressure is mentioned. When air is supplied from the introduction pipe (not illustrated in figures) connected to the opening 42a, the air is lead to the driving pressure introduction chamber S1 via the driving pressure introduction path 432 in the piston 43. In response, the piston 43 is pushed upward against the bias of the spring 44. As a result, the diaphragm 22 is detached from the seat 21, the valve is opened, and the fluid flows. On the other hand, when the air is not lead to the driving pressure introduction chamber S1, the piston 43 is pushed downward in accordance with the bias of the spring 44. As a result, the diaphragm 22 comes into contact with the seat 21, the valve is closed, and the fluid is blocked.

Sensor

The fluid control device V1 includes the pressure sensor P and the magnetic sensor, having the magnet M1 and the magnetic body M2, as a sensor for detecting the operation in the device.

The pressure sensor P, as illustrated in FIG. 3, is installed to a lower surface of the bonnet wall 25 or a side of the flow path. The pressure sensor P is connected to the closed space S2 defined by the diaphragm 22, the partition 241, and the diaphragm retainer 23, of the bonnet 24 via the connection hole 241d. This pressure sensor P is constituted by a pressure-sensitive element, detecting a pressure change, and a conversion element and the like, converting a detected value of the pressure detected by the pressure-sensitive element to an electric signal. As a result, the pressure sensor P is possible to detect the pressure in the space defined by the diaphragm 22, the partition 241, and the diaphragm retainer 23, of the bonnet 24.

A packing 26 is interposed at a position where the pressure sensor P is connected to the connection hole 241d to ensure the airtightness.

The pressure sensor P may detect either a gauge pressure or an atmospheric pressure, and a threshold value referred by a discrimination processing unit 711 (described later with reference to FIG. 7) may be set according to each case.

Further, in the present embodiment, the pressure change in the closed space S2 is detected by the pressure sensor P to detect the abnormality of the fluid control device V1 caused by fluid leaks and the like, but the condenser type microphone unit may be used as the pressure sensor P. That is, the condenser type microphone unit has a vibration plate vibrating in response to sound waves and a counter electrode arranged to face the vibration plate, and a change in capacitance between the vibration plate and the counter electrode is converted into a change in voltage to be an audio signal. Then, this condenser type microphone unit becomes omnidirectional (nondirectional) by closing the air chamber provided on a back side of the vibration plate. In the case of the omnidirectional, since the condenser type microphone unit operates by capturing changes in sound pressure due to sound waves from all directions, the condenser type microphone unit can be used as the pressure sensor.

A magnetic body M2 is installed to the opening 25b of the bonnet wall 25, and this magnetic body M2 constitutes the magnetic sensor with the magnet M1 installed to the diaphragm retainer 23.

With this magnetic sensor, the opening/closing operation of the valve is possible to be detected as follows. While the magnet M1 slides in response to the vertical movement of the diaphragm retainer 23, the magnetic body M2 is fixed to the inside of the valve body 1 with the bonnet wall 25 and the bonnet 24. As a result, it is possible to detect the operation of the diaphragm retainer 23 and the opening/closing operation of the valve based on changes in a magnetic field generated between the magnet M1, which is vertically moving in accordance with the vertical move of the diaphragm retainer 23, and the magnetic body M2 with a fixed position.

The magnetic sensor is used in this embodiment, but the present invention is not limited to this, and other types of sensors such as an optical positioning sensor may be used in other embodiments.

Each of the pressure sensor P and the magnetic sensor is connected to one end of the flexible cable 51 for communication having flexibility (the magnetic sensor is connected to the magnetic body M2 in detail), and the other end of the flexible cable 51 is connected to the circuit board 52 provided on the outside of the fluid control device V1.

In this embodiment, a processing module 71 (described later with reference to FIG. 7) executing a predetermined information processing is formed on the circuit board 52. The processing module 71 executes a process of detecting an abnormality in the fluid control device V1 based on the information acquired from the pressure sensor P and the magnetic sensor. Then, the circuit board 52 is provided with a substantially rectangular-shaped connector 53 for connecting external terminals. As a result, it is possible to extract data measured by the pressure sensor P and the magnetic sensor.

In the present embodiment, a flexible printed circuits (FPC) is used for the flexible cable 51 and the circuit board 52, and flexible cable 51, circuit board 52, and connector 53 are integrally configured. By using the flexible printed circuits to the flexible cable 51 and the circuit board 52, it is possible to use a space between the members as a wiring path. As a result, it is possible to reduce the size of the fluid control device V1 itself as compared to using covered wires.

Further, the processing module 71 may be stored in the fluid control device V1 separately from the circuit board 52, or may be configured as a part of the pressure sensor P or the magnetic sensor.

In addition, types and shapes of the connector 53 can be appropriately designed according to various standards.

The fluid control device V1 having the above configuration detects leaks of the fluid and the like from the flow path to the closed space S2 by detecting the pressure inside of the closed space S2, and can detect a damage and the like of the diaphragm 22 and the abnormality of the fluid control device V1.

Software Configuration

Subsequently, the software configuration of the fluid control device V1 will be described.

The processing module 71 has an arithmetic circuit and a memory provided on the circuit board 52, and as illustrated in FIG. 7, the processing module 71 has a functional block including the discrimination processing unit 711 and a communication processing unit 712. The processing module 71 is configured to be connectable to the pressure sensor P and the magnetic sensor by the flexible cable 51, and is able to receive data from the pressure sensor P and the magnetic sensor.

The discrimination processing unit 711 compares a predetermined threshold value stored in a reference table or the like with the detected value of the pressure detected by the pressure sensor P, and thereby executes a process of discriminating the abnormality of the fluid control device V1 caused by the leaks of the fluid to the closed space S2. That is, during a normal usage, a limit value of the pressure in the closed space S2, assumed by the opening and closing of the valve of the fluid control device V1, is set as a predetermined threshold value. Then, when the detected value of the pressure in the closed space S2 exceeds the threshold value, it is discriminated that an abnormality has occurred in the fluid control device V1. The rationality of such discrimination is that the detected value of the pressure in the closed space S2 is regarded as exceeded the threshold value as a result of an increase of the pressure in the closed space S2 due to the leaks of the fluid to the closed space S2 for the damage of the diaphragm 22 or the like, or a decrease of the pressure in the closed space S2 due to a decompression in the flow path.

The communication processing unit 712 is a functional unit for executing a process of transmitting the discrimination result by the discrimination processing unit 711 to the external terminal 61 connected via the connector 53.

In the present embodiment, a processing result by the discrimination processing unit 711 is transmitted to the external terminal 61 via the connector 53, but the communication processing unit 712, for example, is constituted with a wireless LAN, Bluetooth (registered trademark), an infrared communication, or Zigbee (registered trademark) and the like, and the processing result may be transmitted by wireless communication.

Further, when another terminal is always connected to the connector 53, the communication processing unit 712 may transmit the discrimination result by the discrimination processing unit 711 at a predetermined cycle set arbitrarily, such as one hour or one day. In this respect, it is difficult to detect the moment of a slight leak of the fluid, but if it is several days or so, it can be detected because the pressure increases. On the other hand, since the closed space S2 is an airtight space, it is unlikely that a problem will occur immediately even if a minute leak occurs. Therefore, there is no problem even if transmission is performed according to a predetermined cycle. Furthermore, when information transmission is performed in a predetermined cycle as described above, power consumption can be suppressed.

Further, when a plurality of the fluid control devices V1 are integrated to constitute the fluid controller, the communication processing unit 712 of each fluid control device V1 can transmit at different timings, together with of a self-identification information capable of identifying itself with respect to the external terminal 61, the discrimination result by the discrimination processing unit 711 for the each fluid control device V1.

Since self-identification information capable of individually identifying the fluid control device V1 is transmitted to the external terminal 61, an abnormality occurring in any one of the plurality of the fluid control device V1 constituting the fluid controller can be discriminated.

In addition, by transmitting the determination result to the external terminal 61 at different timings for each fluid control device V1, it is possible to avoid the problem of packet collision, and compared to a situation where the transmission is made all at once, it is also possible to prevent processing overload. Furthermore, unlike in the case of transmissions made all at once, it is not necessary to change the radio channel used for data transmission for each of the fluid control device V1, and therefore it is not necessary to prepare many channels. In particular, when a connecting means of the fluid control device V1 and the external terminal 61 is configured by Bluetooth (registered trademark), a number of simultaneously connected devices is limited (usually seven), and therefore by changing the transmission timing, a number of the fluid control device V1 can exceed the number simultaneously connected devices.

The external terminal 61 is a so-called personal computer or a server, or a portable terminal capable of transmitting, receiving, and processing data, and includes hardware resources such as a CPU, a computer program executed by the CPU, a RAM (Random Access Memory) or ROM (Read Only Memory) storing computer programs or predetermined data, and an external storage such as a hard disk drive.

The external terminal 61 has a communication processing unit for receiving the determination result of the fluid leaking to the closed space S2 of the fluid control device V1. In response to a request from a terminal used by an administrator or a supervisor of the fluid control device V1, the information received from the fluid control device V1 is appropriately provided to a terminal used by the supervisor or the like.

In the present embodiment, the external terminal 61 directly communicates data with the fluid control device V1, but the present invention is not limited to this, and communication may be performed via a relay device to relay transmission or reception of data as appropriate.

Because of the fluid control device V1 consisting of the above configuration, the abnormality of the fluid control device V1 caused by the fluid leaking to the closed space S2 can be detected based on a comparison between the pressure in the closed space S2 detected by the pressure sensor P and the predetermined threshold value.

Further, since the information regarding the abnormality of the fluid control device V1 is collected in the external terminal 61, the supervisor of the fluid control device V1 is able to monitor an operation condition of the fluid control device V1 without any burden.

Furthermore, since the fluid control device V1 detects the pressure in the closed space S2 and detects the abnormality by comparing the predetermined threshold value with the detected value, the fluid control device V1 can detect an abnormality even if the inside of the closed space S2 becomes a negative pressure.

In the above embodiment, when it is determined that there is an abnormality in the fluid control device V1, the fluid control device V1 can be provided with a means for issuing a warning to that effect. Specifically, for example, it can be configured by a visible lamp or the like. This point is the same for other embodiments described later.

Moreover, in the present embodiment, the abnormality of the fluid control device V1 is detected by detecting the pressure inside of the closed space S2 where the space is defined by the diaphragm 22, the diaphragm retainer 23, and the bonnet 24, but it is possible to detect the abnormality of the fluid control device V1 such as a damage to the diaphragm 22 by detecting the pressure of a confined space, where separated by the diaphragm 22 on the side opposite to the flow path with the diaphragm 22, as the closed space S2.

Example 2

Next, a fluid control device according to a second embodiment of the present invention will be described.

Figure 8:
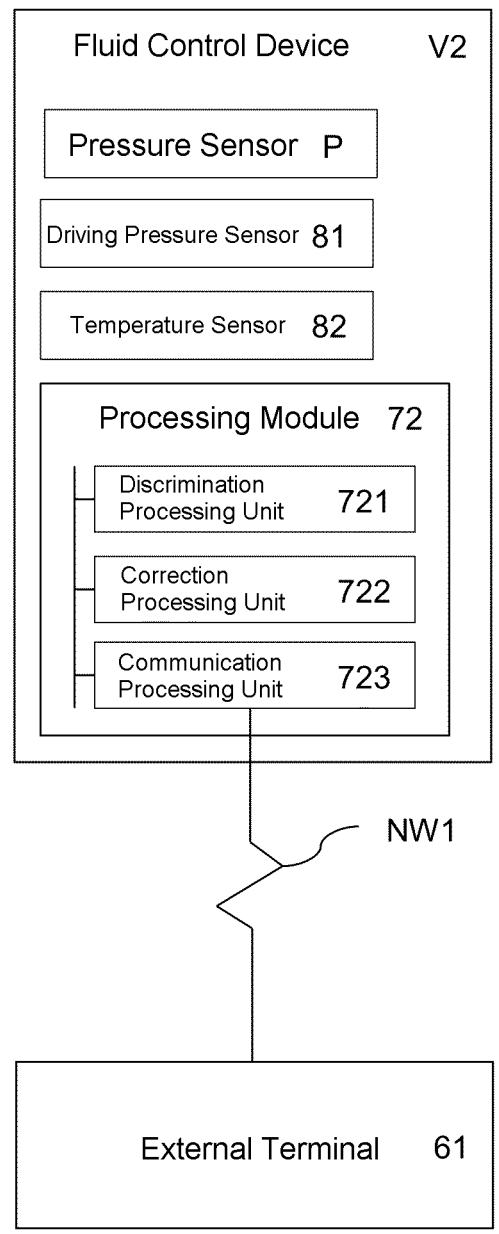
FIG. 8 is a functional block diagram showing functions of the fluid control device according to a second embodiment of the present embodiment.

As illustrated in FIG. 8, a fluid control device V2 according to the present embodiment includes a driving pressure sensor 81 detecting a driving pressure of the fluid control device V2 and a temperature sensor 82 measuring an external temperature in addition to the pressure sensor P and the magnetic sensor included in the fluid control device V1 according to the first embodiment. Further, a processing module 72 included in the fluid control device V2 according to the present embodiment constitutes a functional block including a discrimination processing unit 721, a correction processing unit 722, and a communication processing unit 723.

The processing module 72 of the present embodiment is configured to be further connectable to the driving pressure sensor 81 and the temperature sensor 82 by a predetermined case, wiring and the like, and is able to receive data from the driving pressure sensor 81 and the temperature sensor 82.

Furthermore, the hardware configuration or structure of the fluid control device V2 of the present embodiment is the same as that in the first embodiment described above, except that the driving pressure sensor 81 and the temperature sensor 82 are provided.

Further, unless otherwise specified, in the description of the present embodiment, the members and the functional parts having the same numbers (reference numerals) as those of the first embodiment retain or executes the processes of the same functions as the above-mentioned members and the functional parts, and therefore, the explanation is omitted.

The driving pressure sensor 81 is a sensor to detect the driving pressure of the Fluid control device V2 and includes an operation detecting mechanism detecting an operation of the fluid control device V2.

This driving pressure sensor 81 is installed on an opening 42a of the fluid control device V2 and detects an air pressure as the driving pressure introduced into the fluid control device V2. An information related to the detected air pressure is supplied to the correction processing unit 722.

The temperature sensor 82 measures the external temperature in an environment where the fluid control device V2 is installed. An information related to the measured external temperature is supplied to the correction processing unit 722.

Similar to the discrimination processing unit 711, the discrimination processing unit 721 compares a predetermined threshold value held in a reference table or the like with the detected value of the pressure detected by the pressure sensor P, and as a result, the discrimination processing unit 721 executes a process of discriminating an abnormality of the fluid control device V2 caused by the fluid leaks or the like to the closed space S2. On the other hand, in the present embodiment, the predetermined threshold value is corrected by the correction processing unit 722, and when the correction is made, by comparing the corrected threshold value with the detected value of the pressure detected by the pressure sensor P, the discrimination processing unit 721 executes the process of discriminating the abnormality of the fluid control device V2 caused by the fluid leaks or the like to the closed space S2.

The correction processing unit 722 corrects the predetermined threshold value that the discrimination processing unit 721 refers to discriminate the fluid leaks to the closed space S2 according to the air pressure detected by the driving pressure sensor 81 and the external temperature measured by the temperature sensor 82.

In other words, when the air pressure is changed to open and close the fluid control device V2, the pressure inside of the closed space S2 is changed by a vertical movement of the piston 43. Therefore, the correction processing unit 722 corrects the predetermined threshold value so that the discrimination processing unit 721 distinguishes between the pressure change inside of the closed space S2 by this air pressure and the pressure change inside of the closed space S2 caused by the abnormality of the fluid control device V2. Specifically, the threshold value is corrected to a higher value since the pressure inside of the closed space S2 increases when the air is introduced, and the threshold value is corrected to a lower value since the pressure inside of the closed space S2 decreases when the air is exhausted. As a result, the discrimination processing unit 721 can discriminate the pressure change inside of the closed space S2 caused by the abnormality of the fluid control device V2 regardless of the pressure change inside of the closed space S2 due to the change in the air pressure.

Since the drive pressure sensor 81 is used in the present embodiment, it is possible to discriminate the pressure change inside of the closed space S2 caused by the fluid leaks and the like even during opening/closing operations of the fluid control device V2. Specifically, by experimentally finding an appropriate transfer function that converts the driving pressure into the required corrected value, it is possible to correct a transient pressure change inside of the closed space S2 at the moment when the piston 43 is moving.

At the same time, if the detected value of the pressure sensor P does not increase even though the pressure increase inside of the closed space S2 is expected from the detected value of the driving pressure sensor 81, a failure of the piston 43 or the pressure sensor P can be determined.

Furthermore, the pressure inside of the closed space S2 is changed by the external temperature. Therefore, the correction processing unit 722 corrects the predetermined threshold value so that the discrimination processing unit 721 may distinguish between the pressure change inside of the closed space S2 caused by the external temperature and the pressure change inside of the closed space S2 caused by the abnormality of the fluid control device V2 and discriminate the abnormality of the fluid control device V2. Specifically, the threshold value is corrected to a higher value as the external temperature rises, and the threshold value is corrected to a lower value as the external temperature falls. As a result, the discrimination processing unit 721 can discriminate the pressure change inside of the closed space S2 caused by the abnormality of the fluid control device V2, such as the fluid leaks and the like, regardless of the pressure change inside of the closed space S2 by the change in the external temperature.

Similar to the communication processing unit 712 of the first embodiment described above, the communication processing unit 723 is a functional unit for executing a process of transmitting the discrimination result by the discrimination processing unit 721 to the external terminal 61.

The fluid control device V2 according to the present embodiment having the above configuration can detect the abnormality of the fluid control device V2 by identifying the pressure change inside of the closed space S2 caused by the abnormality, such as the fluid leaks and the like, even if the pressure inside of the closed space S2 is changed due to the air as the driving pressure or the external temperature.

Example 3

A fluid control device according to a third embodiment of the present invention will be described.

Figure 9:
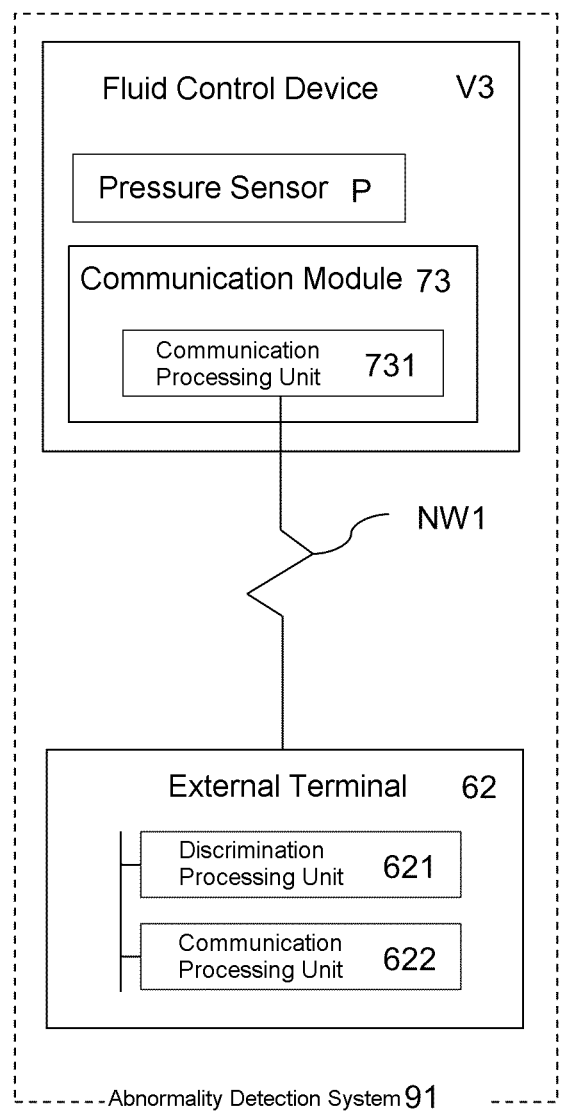
FIG. 9 is a functional block diagram showing functions of the abnormality detection system for the fluid control device according to a third embodiment of the present invention.

As illustrated in FIG. 9, an abnormality detection system 91 includes a fluid control device V3 and an external terminal 62. In this abnormality detection system 91, the external terminal 62 is provided with a functional unit similar to the discrimination processing unit 711 provided in the fluid control device V1 according to the first embodiment described above, and an abnormality of the fluid control device V3 caused by the fluid leaks and the like into the closed space S2 is discriminated on a side of the external terminal 62.

The fluid control device V3 according to the present embodiment has a pressure sensor P, like the fluid control device V1 according to the first embodiment described above, while a communication module 73 executing only data communication instead of the processing module 71.

Similar to the processing module 71 of the first embodiment described above, the communication module 73 is configured on the circuit board 52, is configured to be connectable to the pressure sensor P and the magnetic sensor by the flexible cable 51, and can receive data from the pressure sensor P and the magnetic sensor.

Then, the communication processing unit 731 included in the communication module 73 executes a process of transmitting the detected value of the pressure inside of the closed space S2 detected by the pressure sensor P to the external terminal 62.

The hardware configuration or structure of the fluid control device V3 according to the present embodiment is the same as that of the first embodiment described above. Furthermore, unless otherwise specified, in the description of the present embodiment, the members and functional parts having the same numbers (reference numerals) as those of the first embodiment retain or execute the processes of the same functions as the above-mentioned members and functional parts, and therefore, the explanation is omitted.

The external terminal 62 is a so-called personal computer or a server, or a portable terminal capable of transmitting, receiving, and processing data, includes hardware resources such as a CPU, a computer program executed by the CPU, a RAM or ROM storing computer programs or predetermined data, and an external storage such as a hard disk drive, and includes a functional unit configured by a discrimination processing unit 621 and a communication processing unit 622.

In the present embodiment, the external terminal 62 constitutes an abnormality detection device that is responsible for discriminating the abnormality of the fluid control device V3.

Similar to the discrimination processing unit 711 according to the first embodiment, the discrimination processing unit 621 compares a predetermined threshold value stored in the reference table and the like with the detected value detected by the pressure sensor P, and thereby executes a process of discriminating the abnormality of the fluid control device V3 caused by the leaks of the fluid to the closed space S2. In the present embodiment, the detected value of the pressure detected by the pressure sensor P is acquired from the fluid control device V3 by the communication processing unit 622.

The communication processing unit 622 receives information related to the detected value of the pressure inside of the closed space S2 by the pressure sensor P from the fluid control device V3 connected via the connector 53.

In this embodiment, the discrimination of the abnormality of the fluid control device V3 caused by the fluid leaks and the like is executed on the side of the external terminal 62, but similar to the first embodiment, in response to a request of a terminal used by a supervisor and the like of the fluid control device V3, a discrimination result of the abnormality of the fluid control device V3 discriminated on the external device 62 is appropriately provided to the terminal used by the supervisor and the like.

Similar to the first embodiment, the abnormality detection system 91 according to the present embodiment having the above configuration, can detect the abnormality caused by the fluid leaks and the like of the fluid control device V3. In addition, according to the present embodiment, as a result of executing the process of discriminating the abnormality of the fluid control device V3 on the side of the external terminal 62, a software configuration of a fluid control device V3 side can be simplified, and maintenance such as debugging the program executed by the discrimination processing unit 621 becomes easy.

Example 4

A fluid control device according to a fourth embodiment of the present invention will be described.

Figure 10:
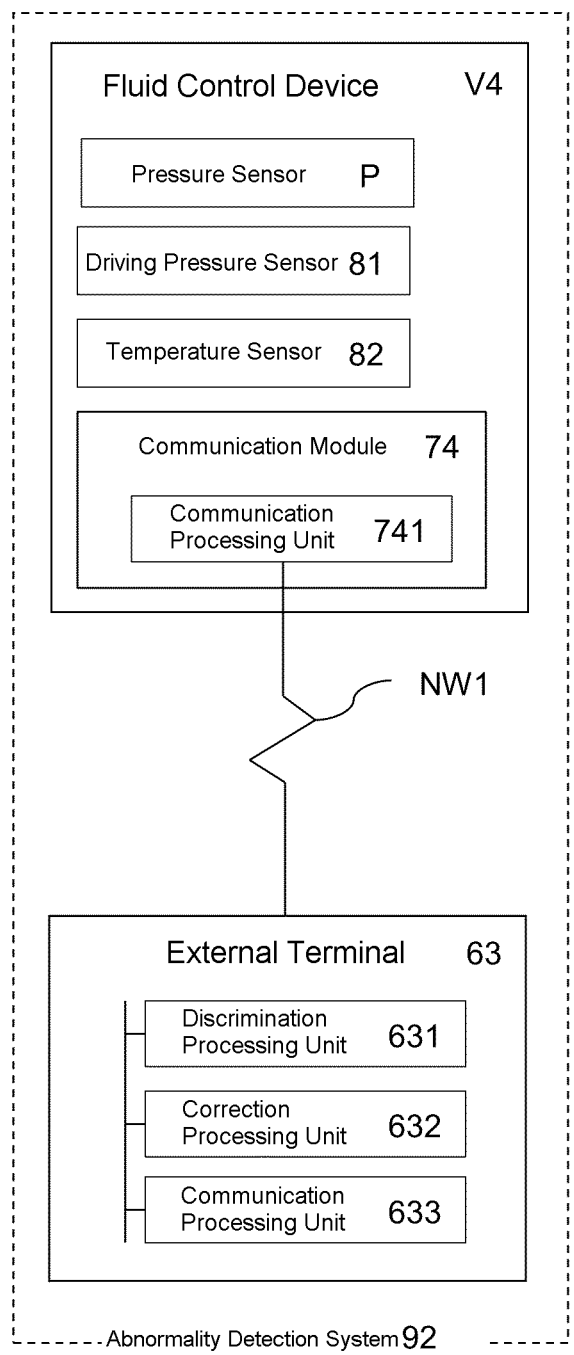
FIG. 10 is a functional block diagram showing functions of an abnormality detection system for the fluid control device according to a fourth embodiment of the present invention.

As illustrated in FIG. 10, an abnormality detection system 92 according to the present embodiment includes a fluid control device V4 and an external terminal 63, like the abnormality detection system 91 according to the third embodiment described above, and this is an example that the fluid control device V4 has the driving pressure sensor 81 and the temperature sensor 82, and the external terminal 63 has a correction processing unit 632.

Each of the driving pressure sensor 81 and the temperature sensor 82 have the same configurations and functions as the driving pressure sensor 81 and the temperature sensor 82 according to the second embodiment described above, and respectively detect driving pressures and external temperatures of the fluid control device V4.

Similar to the processing module 71 of the first embodiment described above, a communication module 74 is configured on the circuit board 52, and is configured to be connectable to the pressure sensor P by the flexible cable 51. On the other hand, the present embodiment is further configured to be connectable to the driving pressure sensor 81 and the temperature sensor 82. Then, an information related to a detected value of the pressure inside of the closed space S2, the driving pressure, and the external temperature, detected by the pressure sensor P, the driving pressure sensor 81, and the temperature sensor 82, is transmitted to the external terminal 63 by a communication processing unit 741 included in the communication module 74.

The hardware configuration or structure of the fluid control device V4 according to the present embodiment is the same as that of the first embodiment described above, except that the driving pressure sensor 81 and the temperature sensor 82 are provided. Further, unless otherwise specified, in the description of the present embodiment, the members and the functional parts having the same numbers (reference numerals) as those of the first embodiment retain or executes the processes of the same functions as the above-mentioned members and the functional parts, and therefore, the explanation is omitted.

The external terminal 63 includes a CPU, a computer program executed by the CPU, a RAM or ROM storing computer programs or predetermined data, and is configured by the hardware resources, such as an external storage device such as a hard disk drive, and includes a functional unit configured by a discrimination processing unit 631, the correction processing unit 632, and the communication processing unit 633.

In the present embodiment, the external terminal 63 constitutes an abnormality detection device that is responsible for discriminating the abnormality of the fluid control device V4.

Similar to the discrimination processing unit 721 according to the second embodiment, the discrimination processing unit 631 compares the predetermined threshold value with the detected value of the pressure detected by the pressure sensor P, and thereby discriminates the abnormality of the fluid control device V4 caused by the flow leaks to the closed space S2. On the other hand, when the predetermined threshold value, that serves as a reference for the abnormality discrimination process of the fluid control device V4, is corrected by the correction processing unit 632, a process of discriminating the abnormality of the fluid control device V4 is executed as a reference for a corrected threshold value.

Similar to the correction processing unit 722 according to the second embodiment, the correction processing unit 632 corrects the predetermined threshold value that the discrimination processing unit 631 refers to discriminate the abnormality of the fluid control device V4 according to the air pressure detected by the driving pressure sensor 81 and the external temperature measured by the temperature sensor 82. However, unlike the second embodiment, an information related to the air pressure and the external temperature is provided from the fluid control device V4 to the external terminal 63 in this embodiment.

The communication processing unit 633 receives information related to the detected value of the pressure inside of the closed space S2 by the pressure sensor P, the driving pressure by the driving pressure sensor 81, and the external temperature by the temperature sensor 82 from the fluid control device V4 connected via the connector 53.

Similar to the second embodiment, the abnormality detection system 92 according to the present embodiment having the above configuration can detect the abnormality of the fluid control device V4 caused by the fluid leaks to the closed space S2 by identifying the pressure inside of the closed space S2 caused by the fluid leaks, even if the pressure inside of the closed space S2 is changed due to the air as the driving pressure or the external temperature. Furthermore, according to the present embodiment, as a result of executing the process of discriminating the abnormality of the fluid control device V4 on the side of the external terminal 63, a software configuration of the fluid control device V4 can be simplified, and maintenance such as debugging the program executed by the discrimination processing unit 631 or the correction processing unit 632 becomes easy.

In the fluid control devices V2 and V4 according to the second and fourth embodiment described above, the point that the air pressure as the driving pressure is changed by the opening/closing operations to cause the pressure change inside of the closed space S2 is noted, and the driving pressure sensor is used as the operation detecting mechanism. In this regard, if the opening/closing operations of the fluid control device V2 can be detected, the operation detecting mechanism other than the driving pressure sensor can distinguish the pressure change inside of the closed space S2 by opening/closing of the fluid control device V2 with the pressure change inside of the closed space S2 caused by the abnormality of the fluid control devices V2, V4, to discriminate the abnormality of the fluid control devices V2, V4.

As another example of such the operation detecting mechanism of the fluid control devices V2 and V4, an opening/closing operation detecting mechanism that mechanically detects the opening/closing operations of the fluid control devices V2 and V4 can be adopted. In other words, a mechanism that detects the opening/closing operation by operating a switch or the like of the fluid control device, or a mechanism that detects operations of the members inside of the device accompanying the opening/closing operation can be achieved. Specifically, the mechanism to detect the operation of the member inside of the device accompanying the opening/closing operation, for example, is achieved by the magnetic sensor provided on the diaphragm retainer 23, or the limit switch installed on the actuator body 41 or the actuator cap 42 and the like. If this limit switch is provided so as to be pressed in response to the vertical movement of the piston 43 accompanying the opening/closing operation, the opening/closing operations of the fluid control devices V2, V4 can be detected.

In addition, the operation detecting mechanism can also be configured by an opening/closing identification means of identifying the opening/closing operation based on the detected value of the pressure and the like that can be changed by the opening/closing operations of the fluid control devices V2 and V4. Specifically, such opening/closing identification means may be achieved by, for example, AI (Artificial Intelligence). In other words, incorporating the AI into the fluid control devices V2, V4, and providing an automatic learning means in the AI, correlations between a fluctuation pattern of the detected value by the pressure sensor P, the magnetic sensor, or the limit switch, and the opening/closing operations are learned, and therefore, it is possible to identify the opening/closing operations from a pattern analysis.

Figure 11:
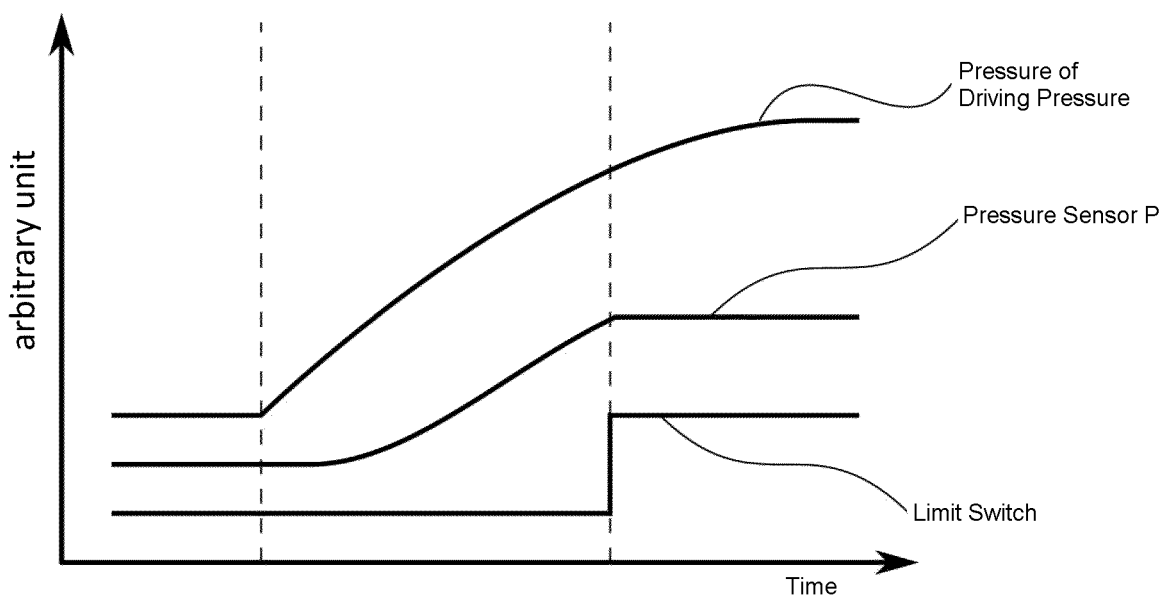
FIG. 11 is a graph explaining time required to open and close the fluid control device.

From the operation data of the fluid control devices V2, V4, FIG. 11 illustrates data at a predetermined time before and after switching an opening/closing state of the fluid control devices V2, V4, that is detected from the change of the pressure sensor P and the limit switch. The predetermined time is defined as a time (it is defined as the time from a start of introducing the driving pressure until the fluid control devices V2, V4 are fully opened. The time between the two dotted lines in FIG. 11 corresponds to this time.) required for opening/closing of the fluid control devices V2, V4.

By inputting this as learned data and comparing it with a slope of an actual detected value by the pressure sensor P and the like, it is possible to identify whether the cause of the pressure fluctuation is due to the opening/closing operation or others. Specifically, the slope of the detected value is compared to the learned data, and if it is steep, it can be estimated that the leak is due to breaks and the like of the diaphragm 22. If it is gentle, it can be estimated that a minute leak such as a cavity-leak or the like or a leak of the closed space S2 due to breaks or the like of the O-ring O2.

Not limited to this example, the detected value, which is a basis for identifying the opening/closing operation, may be anything that changes according to the opening/closing operations of the fluid control devices V2, V4, and various things, such as a pressure in a given space inside of the device and a value of a change in a magnetic fields acquired by the magnetic sensor installed so that the magnetic field changes in accordance with the opening/closing operations, can be used.

As the operation detecting mechanism detecting the operations of the fluid control devices V2, V4, an opening/closing detecting mechanism having the automatic learning means of the limit switch and the AI and the like instead of the driving pressure sensor 81 detecting the driving pressure, and then the abnormality of the fluid control devices V2, V4, can be discriminated for distinguishing the pressure change inside of the closed space S2 by opening/closing of the fluid control devices V2, V4, from the pressure change inside of the closed space S2 caused by the abnormality of the fluid control device V2.

When the operation detecting mechanism is achieved by the AI as described above, a functional unit of the AI can be provided on the external terminals 62, 63, or can be incorporated in the fluid control devices V2, V4.

REFERENCE SIGNS LIST

V1, V2, V3, V4 fluid control device
1 valve body
11 base
12 cylindrical part
2 bonnet part
21 seat
22 diaphragm
23 diaphragm retainer
24 bonnet
25 bonnet wall
3 cover part
31 cover
32 plate
33 plate
4 actuator part
41 actuator body
42 actuator cap
43 piston
44 spring
51 flexible cable
52 circuit board
53 connector
61, 62, 63 external terminal
621, 623 discrimination processing unit
632 correction processing unit
622, 633 communication processing unit
71, 72 processing module
711, 721 discrimination processing unit
722 correction processing unit
712, 723 communication processing unit
722 correction processing unit
73, 74 communication module
731, 741 communication processing unit
81 driving pressure sensor
82 temperature sensor
91, 92 abnormality detection system
M1 magnet
M2 magnetic body
P pressure sensor
S1 driving pressure introduction chamber
S2 closed space

The invention claimed is:

1. A fluid control device having a flow path and a closed space that is isolated from the flow path by an isolation member configured to change in form or positioning, responsive to opening/closing operations of an actuator member, while isolating the closed space from the flow path, between an open state that opens the flow path and a closed state that closes the flow path, and the flow device having a capability of detecting an abnormality of the fluid control device, comprising:

an opening/closing mechanism configured to selectively cause the opening/closing operations of the actuator member;
a pressure sensor configured to detect a pressure inside of the closed space and generate a detected pressure value;
a temperature sensor, configured to measure an external temperature and generate a measured external temperature value;
a processing module configured to execute a predetermined information process; and
an operation detecting mechanism configured to detect an operation of the fluid control device by detecting movement or position of the actuator member, and/or by detecting operation by the opening-closing mechanism, and/or detecting an actuation force for the opening-closing mechanism, and to generate an information indicating the operation detected;
wherein the predetermined information process includes:
a discriminating process configured to discriminate one or more types of abnormality of the fluid control device, at least one of the types including a leaking of fluid from a fluid path, via an abnormality of the isolation member, into the closed space, the discriminating process including a comparing of the detected pressure value with a predetermined threshold value; and
a correcting process configured to correct the predetermined threshold value in accordance with the information from the operation detecting mechanism indicating the operation detected and the measured external temperature value.

2. The fluid control device according to claim 1, wherein:
the opening-closing mechanism comprises a driving pressure introduction chamber configured to receive air at a driving pressure, and a driving pressure path configured to route or convey the driving pressure to the actuator member;
the operation detection mechanism comprises a driving pressure sensor arranged to detect the reception of air at the driving pressure and output, in response, a detected driving pressure value, and,
the correcting process is further configured to correct the predetermined threshold value in accordance with, at least in part, the output of the detected driving pressure value.

3. The fluid control device according to claim 1, wherein the operation detection mechanism comprises an opening/closing detecting mechanism configured to detect an opening/closing operation of the fluid control device, by detecting a mechanical operation of the opening/closing mechanism, and to generate in response an indication of the detected opening/closing operation of the fluid control device, and,
the correcting process is further configured to correct the predetermined threshold value in accordance with, at least in part, the indicated detected opening/closing operation of the fluid control device.

4. The fluid control device according to claim 1, wherein the operation detecting mechanism includes an automatic learning means that is configured to identify an opening/closing operation by performing a pattern analysis that is based, at least in part, on a correlation between a fluctuating pattern of the detected pressure value and the opening/closing operation.

5. The fluid control device according to claim 1, wherein:
the flow path includes a seat,
the isolation member is a diaphragm configured to extend over the seat, and
the opening-closing mechanism is further configured to close the flow path by bringing the diaphragm into contact with the seat and to open the flow path by causing the diaphragm to detach from the seat.

6. The fluid control device according to claim 1, further comprising a valve seat arranged in the fluid path, wherein
the isolation member is arranged over the valve seat,
the mechanical operations of the actuator member, in the changing the form-positioning of the isolation member to the close state, include the actuator member contacting and applying a force to the isolation member, in a manner that brings the isolation member into contact with the valve seat,
the mechanical operations of the actuator member, in the changing the form and/or positioning of the isolation member to the open state include withdrawing the actuator member from contact with the isolation member.

7. An abnormality detection method for a fluid control device having a capability to detect an abnormality and having a flow path and a closed space that is isolated from the flow path by an isolation member having a structure configured to change in form and/or positioning, responsive to opening/closing operations of an actuator member, between an open state that opens the flow path and a closed state that closes the flow path, the method comprising:
a step of selectively causing the mechanical opening/closing operations of the actuator member;
a step of detecting a pressure inside of the closed space and generating a detected pressure value, by a pressure sensor;
a step of detecting an external temperature and generating a measured external temperature value, by a temperature sensor;
a step of detecting the operation of the fluid control device, comprising detecting movement or position of the actuator member, and/or detecting operation by the opening-closing mechanism, and/or detecting an actuation force for the opening-closing mechanism, and generating in response an information indicating the operation detected;
a step of discriminating one or more types of abnormality of the fluid control device, at least one of the types including a leaking of fluid, via an abnormality of the isolation member, from a fluid path into the closed space, wherein the step of discriminating comprises a comparing of the detected pressure value with a predetermined threshold value; and
a step of correcting the predetermined threshold value in accordance with the information generated by the step of detecting the operation of the fluid control device and the measured external temperature value.

8. An abnormality detection system for a fluid control device having a capability to detect an abnormality and having a flow path and a closed space that is isolated from the flow path by an isolation member configured to change in form and/or positioning, responsive to opening/closing operations of an actuator member, while isolating the closed space from the flow path, between an open state that opens the flow path and a closed state that closes the flow path, the system comprising a communication module in the fluid control system and an external terminal, mutually configured to communicate with each other;
wherein the fluid control device comprises:
an opening-closing mechanism configured to selectively cause the mechanical opening/closing operations of the actuator member;
a pressure sensor configured to detect a pressure inside of the closed space and generate a detected pressure value;
a temperature sensor configured to measure an external temperature and generate a measured external temperature value;
an operation detecting mechanism configured to detect an operation of the fluid control device, comprising detecting movement or position of the actuator member, and/or detecting operation by the opening-closing mechanism, and/or detecting an actuation force for the opening-closing mechanism, and generating in response an information indicating the operation detected; and
a communication module configured to transmit to the external terminal the detected pressure value generated by the pressure sensor, the measured external temperature value generated by the temperature sensor, and the information output by the operation detecting mechanism indicating and/or related to operation detected; and
wherein the external terminal executes:
a process configured to discriminate one or more types of abnormality of the fluid control device, at least one of the types including a leaking of fluid, via an abnormality of the isolation member, from a fluid path into the closed space, by comparing the detected pressure value received from the fluid control device with a predetermined threshold value, and
a process correcting the predetermined threshold value in accordance with information received from the fluid control device including the external temperature measured value and the information indicating and/or related to the operation of the fluid control device.

* * * * *